(12) United States Patent  
Laumen et al.

(10) Patent No.: US 8,731,097 B2  
(45) Date of Patent: May 20, 2014

(54) TRANSMISSION OF MMS MESSAGES WITH THE CONVERSION OF DATA TYPES AND/OR DATA FORMATS

(75) Inventors: Josef Laumen, Hildesheim (DE); Andreas Schmidt, Braunschweig (DE); Markus Trauberg, Velchede (DE); Sabine Van Niekerk, Salzgitter (DE); Christoph Wojzischke, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 132 days.

(21) Appl. No.: 10/516,776

(22) PCT Filed: Jun. 2, 2003

(86) PCT No.: PCT/DE03/01814  
§ 371 (c)(1),  
(2), (4) Date: Dec. 3, 2004

(87) PCT Pub. No.: WO03/105425  
PCT Pub. Date: Dec. 18, 2003

(65) Prior Publication Data  
US 2005/0174261 A1    Aug. 11, 2005

(30) Foreign Application Priority Data  
Jun. 7, 2002   (DE) .................................. 102 25 425

(51) Int. Cl.  
*H04L 12/58*   (2006.01)  
*H04W 4/12*   (2009.01)

(52) U.S. Cl.  
USPC ........................ 375/295; 455/412.1; 455/466

(58) Field of Classification Search  
USPC ............ 709/230, 227, 231, 206, 246; 341/50; 375/377, 295; 455/466, 412.1; 370/356, 349  
See application file for complete search history.

(56) References Cited

U.S. PATENT DOCUMENTS 6,061,696 A  *  5/2000  Lee et al. ...................... 715/209  
6,784,899 B1     8/2004  Barrus et al. .................. 715/717

(Continued)

FOREIGN PATENT DOCUMENTS

GB    2344197 A    5/2000  ............. G06F 17/30  
JP    06301586 A   10/1994  ............. G06F 12/00

(Continued)

OTHER PUBLICATIONS

Stephane Coolombe and Guido Grassel, "Multimedia adaptation for the multimedia messaging service", Nokia Research Center, Communications Magazine, IEEE, Jul. 2004.*

(Continued)

*Primary Examiner* — Aristocratis Fotakis  
(74) *Attorney, Agent, or Firm* — King & Spalding L.L.P.

(57) ABSTRACT

The present invention relates to a method for transmitting data, a subscriber terminal, a computer program product, and a communications system that provides a sender of data or of a message with additional possibilities for sending data with a higher degree of flexibility for the error-free adaptation of every combination of data and data formats to a given communications system and/or provides the sender with an MMS user application. To this end, a data type and/or data format conversion (KONV) is carried out according to a profile of the recipient (B), whereby a respective reference (LK) to the maintaining of the validity of this reference (LK) is accordingly changes in the data and/or between different data elements of the data type and/or data format conversion (KONV).

11 Claims, 2 Drawing Sheets

(56) References Cited

U.S. PATENT DOCUMENTS

| | | | |
|---|---|---|---|
| 7,274,926 B1 | 9/2007 | Laumen et al. | 455/414.1 |
| 7,392,303 B2* | 6/2008 | Smith et al. | 709/223 |
| 2002/0056123 A1* | 5/2002 | Liwerant et al. | 725/87 |
| 2002/0073205 A1* | 6/2002 | Mostafa | 709/227 |
| 2003/0084177 A1* | 5/2003 | Mulligan | 709/230 |
| 2003/0101246 A1* | 5/2003 | Lahti | 709/221 |
| 2003/0154300 A1* | 8/2003 | Mostafa | 709/231 |
| 2003/0172121 A1* | 9/2003 | Evans et al. | 709/206 |
| 2003/0193951 A1* | 10/2003 | Fenton et al. | 370/392 |

FOREIGN PATENT DOCUMENTS

| | | | | |
|---|---|---|---|---|
| JP | 11-134264 | | 5/1999 | G06F 13/00 |
| JP | 2000090001 A1 | | 3/2000 | G06F 12/00 |
| JP | 2000305837 A | | 11/2000 | G06F 12/00 |
| JP | 2001285491 A | | 10/2001 | G06F 13/00 |
| JP | 2002-108788 | | 4/2002 | G06F 13/00 |
| JP | 2010099897 A | | 5/2010 | B29C 70/16 |
| KR | 20010025658 A | | 4/2001 | G06F 17/00 |
| KR | 20020040953 A | | 5/2002 | H04N 7/14 |
| WO | WO 99/14909 | | 3/1999 | |
| WO | 01/26310 A1 | | 4/2001 | G06F 13/00 |
| WO | WO 02/43414 | | 5/2002 | |
| WO | WO 02/058359 | | 7/2002 | |

OTHER PUBLICATIONS

Korean Office Action, Application No. 1020107026773, 5 pages, Mar. 18, 2011.

* cited by examiner

TRANSMISSION OF MMS MESSAGES WITH THE CONVERSION OF DATA TYPES AND/OR DATA FORMATS

BACKGROUND OF THE INVENTION

The use of the term data in the present invention includes all types of information that can be compiled from the individual components. The individual components or elements can be structured, organized and/or coded according to different standards. Accordingly, data can represent multimedia messages that include diverse elements with different standards.

Methods and apparatus for transferring various data types or formats are known. For example, in addition to voice telephony, a mobile radio system as per the Global System for Mobile Communications Standard GSM already offers the option of sending or receiving information in the form of text messages up to 160 characters long. This service is known as the Short Message Service SMS.

For next-generation mobile radio systems, such as the Universal Mobile Telecommunication System UMTS, a multimedia-capable version of the mobile messaging service is currently being standardized. This service is known as the Multimedia Messaging Service MMS. The Multimedia Messaging Service MMS specifies mechanisms to transport various content from one subscriber of the service via a network to another subscriber. In this document, messages with multimedia content will be known simply as multimedia messages MM to better differentiate them from SMS text messages. By contrast with the SMS, there is no restriction to pure text content with the Multimedia Messaging Service MMS. In the MMS, it also will be possible to format texts however desired and to embed any content in a message. This includes audio and video content, graphics and text. The individual multimedia components of a multimedia message, also known as MM elements, also may contain references to other data known as links. Data referenced in this way either can be integrated into the multimedia message MM as an additional MM element or can be stored in external memory space for downloading later; for example, on a server in a network.

The disclosure below refers, in general, to data quantities having individual elements of text and/or image data with or without sound that are coded to the same or different standards even though the application of the aforementioned standard is a key area of application for the present invention.

A communication system for transmitting this type of data essentially includes three layers: a layer of a data sender with an MMS user application or an MMS user agent, a layer of at least one service provider whose network element triggers the service and is hereinafter referred to as an MMS connection unit or MMS relay/server, and a layer of a receiver with an appropriate MMS user application. The term MMS user application covers an application on both the sender and receiver side; for example, on a mobile phone that implements MMS functionality.

Usually, a mobile phone equipped with an MMS user application does not support all the existing data types or data formats. Current developments indicate a greater number of different data formats for various special applications that in the future may be of interest as elements of a multimedia message. Upgrading all subscriber terminals can practically be excluded due to the high numbers involved and the high software maintenance intervals dictated by development. It can be assumed that an MMS user application in a subscriber terminal therefore can only ever process a selection of the growing number of different data formats. The information as to which data types and data formats are supported by a particular MMS user application (in addition to other individual features of the MMS user application) is part of the MMS user application profile or MMS user agent profile that has to be known to the MMS service provider before multimedia messages can be exchanged. For this purpose, the information is transferred at the beginning of every MMS session from the appropriate terminal to the network and stored there. Given that the information from the MMS user application profile is known to the MMS relay/server of the MMS service provider, this enables it to undertake data type conversions/code conversions and file format conversions. Only those data types and data formats are then forwarded to a MMS user application that it can process. If an MMS relay/server receives a multimedia message that includes two MM elements, where the first MM element contains a link to the second MM element and the data type or data format of the second MM element has to be converted before the multimedia message is forwarded to the recipient in accordance with the information from the MMS user agent profile, then the link in the first MM element is errored after the conversion and no longer can be resolved.

The present invention is directed toward a method, a sender and/or receiver terminal, a computer program product and a communications system that provides a data or message sender additional options for sending data with a higher degree of flexibility with error-free adaptation for every combination of data and data formats to a given communication system and/or MMS user application.

SUMMARY OF THE INVENTION

A method according to the present invention for transmitting data in a communication system, in particular transmitting text and/or image data with or without sound that is coded to the same or different standards, is characterized in that data type and/or data format conversion is undertaken in accordance with a profile of a receiver in which a link is changed appropriately to preserve the validity of this link in the data and/or between different data elements of the data type and/or data format conversion. In other words, when converting a data type and/or data format in accordance with a profile of a receiver to preserve the validity of one or more references in the data between different data elements, at least one link is updated. According to the present invention, it is therefore possible as a result of an automatic link update after a data type and/or data format conversion that internal references remain valid even after conversion of data types and/or data formats and that a multimedia message can always be completely displayed to the receiver in adapted form as per the sender's requirements. According to the present invention, both internal and external references are considered, as is described in an embodiment with reference to the accompanying figures.

In a further development of the present invention, the conversion is undertaken at the provider of the receiver. The resources required for such processing are envisaged in a message transmission network and would relieved, in particular, the load on the subscriber terminal in terms of required processing power and contribute to a reduction in energy consumption.

In one embodiment of the present invention, a link in the data between the different elements is verified. As such, any errors in the data structure could be detected and possibly cleared, but in any case notified to the sender. In one embodiment, a decision then can be made as to whether the damaged or errored data record should be transmitted or deleted and resent by the sender.

The data for transmission preferably would be prepared such that it contains a header to transport organization information and a body to transmit the appropriate useful information. The useful information preferably includes elements in the form of a number of data packets. In one embodiment, the data is transmitted from a user application of a subscriber via a network to a user application of another subscriber in which the transmission is controlled by transactions and/or information elements of a transport protocol added to the data, whereby the information elements include a field name and an appropriate field value. A method according to the present invention is preferably used for data which is transmitted as a multimedia message MM in a Multimedia Messaging Service MMS; in particular, on a mobile subscriber terminal or specifically on a WAP-capable mobile phone as per the GSM, GPRS, EDGE or UMTS standard or combinations thereof.

The Multimedia Messaging Service MMS, the preferred area of application of the present invention, does not currently offer any measures for intercepting, verifying or securely converting external references for easier integration of applications. With the embodiments of the present invention, it will be possible to adapt internal and external references via a sending application with such a high level of reliability that it can be assumed that complete and secure forwarding is guaranteed.

Additional features and advantages of the present invention are described in, and will be apparent from, the following Detailed Description of the Invention and the Figures.

Elements with the same function and mode of operation are labeled with the same references or abbreviations in FIGS. 1 to 4.

DETAILED DESCRIPTION OF THE INVENTION

As already described at the start of this document, the Multimedia Messaging Service MMS enables the transmission of multimedia messages in which formatted text and images with or without sound can be received. The existing restriction in the SMS to a text message length of 160 characters is no longer applicable. Transmission of, among other things, audio and video messages is possible, but the very frequently used SMS messages will continue to be processed within the system in the present invention with resources to match, as is described in the summary of the prior art.

Figure 1:
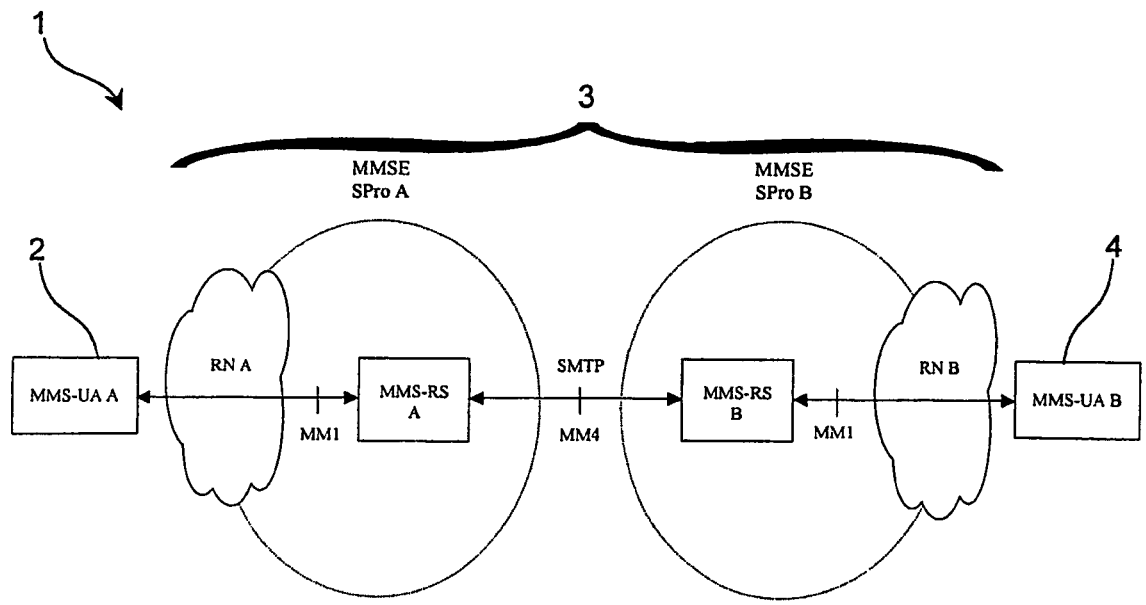
FIG. 1 shows a schematic diagram of an MMS network architecture as per 3GPP.
Figure 2:
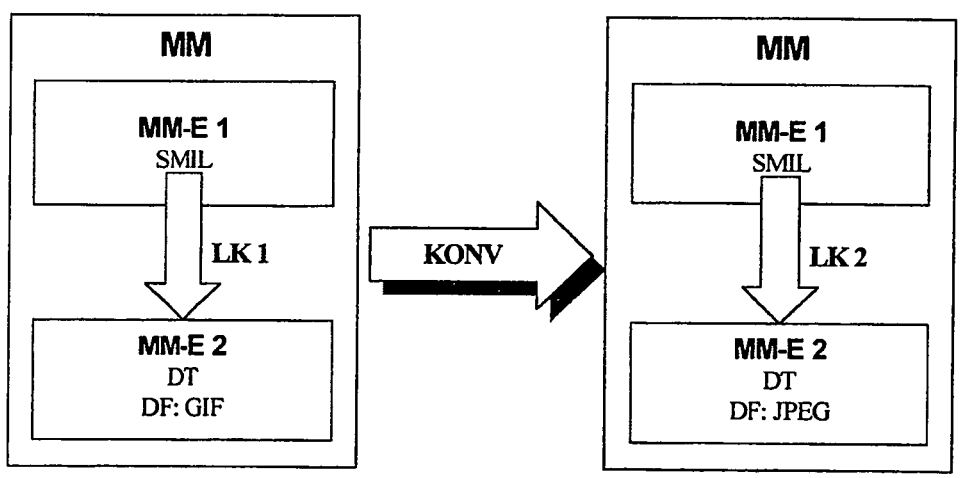
FIG. 2 a flow diagram in which the link in the first MM element has to be reconciled after the data format conversion of the second MM element.

MMS can be implemented using WAP. For radio transmission of data, such as multimedia messages MM the communication system as shown in FIG. 1 should be used. The diagram in FIG. 1 shows a diagram with the prior art from the point of view of 3GPP depicting the exchange of a multimedia message MM between three participating instances in sending and receiving an MM. This communication system 1 includes a layer 2 of a data sender, also labeled as an MMS user application A or MMS user agent A M-UA_A. The term MMS user application covers an application, for example, on a mobile phone that implements MMS functionality. Furthermore, a layer 3 of a service provider SPro is envisaged whose network element triggers the services and is hereinafter referred to as an MMS connection unit or MMS relay/server MMS-RS. An MMS relay/server MMS-RS is a network element that enables the MMS user application MMS-UA to communicate via the network in an area of responsibility or in the Multimedia Messaging Service Environment MMSE of the MMS service provider SPro and provides the MMS functionality. In this example, the interface between layers 2 and 3 is shown as a radio network RN A instead of a dedicated network connection for transmitting a multimedia message MM1. Finally, a layer 4 is envisaged as a layer of a receiver that is also designated as an MMS user application B M-UA B. A radio network RN B is also envisaged here for transmitting the multimedia message MM 1.

More than just one provider SPro, of course, appear in layer 3. This is possible because the data sender M-UA_A and the selected receiver M-UA B can be contracted to different providers SPro A, SPro B as shown in FIG. 1. Furthermore, these different providers can be associated with one another through a third provider as a network operator. Here, however, the simpler representation is shown since the precise structure of layer 3 and the type of transport adaptation of a message, such as from MM1 to MM4, etc., is of no interest for the representation of the present invention.

Generally, a mobile phone equipped with an MMS user agent MMS-UA does not support all the existing data types or data formats. The information as to which data types and data formats are supported by a particular MMS user agent MMS-UA (in addition to other individual features of the MMS user agent) is part of the MMS user agent profile that has to be known to the MMS service provider SPro before multimedia messages MM can be exchanged. This information is therefore transferred at the beginning of every MMS session from the terminal to the network and stored there. Given that the information from the MMS user agent profile is known to the MMS relay/server MMS-RS of the MMS Service Provider SPro, this enables it to undertake data type conversions/code conversions and file format conversions. Only those data types and data formats are then forwarded to a MMS user agent MMS-UA that it can process. The size of a file may change considerably through conversion. The sub-division of data into data types represents a broad classification of data that belong to different media types such as audio, text or static images. The data format, however, provides actual information about the coding of a certain data type such as MP3 coded audio file or a JPEG coded static image. The data format of a file is uniquely identifiable by the extension appended to the filename. For example, a static image coded to the JPEG standard has the extension "jpg" after the filename. The file name and the extension are generally separated by a full stop, for example: "holiday.jpg".

If an MMS relay/server MMS-RS receives a multimedia message MM that includes two MM elements MM-E1, MM-E2, where the first MM element MM-E1 contains a link to the second MM element MM-E2 and the data type or data format of the second MM element MM-E2 has to be converted before the multimedia message MM is forwarded to the recipient in accordance with the information from the MMS user agent profile, the link in the first MM element MM-E1 is errored after the conversion and can no longer be resolved.

Until now, there has been no provision for converting externally stored files that are linked from an MM element MM-E in accordance with the information in an MMS user agent profile of the receiver B and for adapting the link in the multimedia message MM after the conversion.

A multimedia message MM essentially includes a header and optionally a body that contains the multimedia elements MM-E. Since not only each multimedia message MM itself but also each individual element MM-E of the multimedia message MM essentially includes a header and a body, it is also possible that a link LK for referencing a file can be contained either in the header of the multimedia message MM and/or in the header of the relevant MM element and/or in the body. A method according to the present invention is used in which, for links within a multimedia message MM (i.e., between different MM elements MM-E), not only the data types and/or data formats of the MM elements are converted in accordance with the current MMS user agent profile of the receiver, but also the associated link within the MM. In a further development of this method, the aforementioned principle can be applied to externally stored files and their links; i.e., to files that are, for example, stored on a server EXT and are not part of the MM.

Two examples for the aforementioned mechanisms for coordinating links after conversion of data types and/or data formats are described below with reference to diagrams. Firstly, a case will be considered in which a link within a multimedia message MM between different MM elements remains valid after conversion. The second case concerns a link to a file stored on a server that is referenced from the multimedia message MM. Here, a link to incorporate multimedia objects is represented by way of example as a Uniform Resource Location or URL link. In theory, other types of links are possible, but because of their comparatively greater load during implementation, they are not considered further here.

1. Link within a Multimedia Message MM:

A multimedia message MM that contains two MM elements MM-E1, MM-E2 arrives at the MMS relay/server MMS-RS of the receiver. The first MM element MM-E1 is an SMIL presentation; i.e., a presentation that is described in a language standardized by the World Wide Web consortium W3C for synchronizing multimedia contents as per [4]. The first MM element MM-E1 contains a link to a second MM element MM--E2; in this example, a file of the data type DT "static image" of the data format DF "GIF" that is characterized with the characteristic file identifier or extension "gif". The MMS user agent of the receiver is not however, able to display this data format. Consequently, the MMS relay/server converts the data format DF of the linked file in accordance with the MMS user agent profile into another data format DF (here, for example, JPEG, characterized by the extension "jpg" appended to the filename) before the presentation of the entire multimedia message MM to the MMS user agent. This summary is shown in the diagram in FIG. 2.

In accordance with the present invention, the link LK 1 to the second MM element MM-E2 is also reconciled after the conversion KONV. In this case, the extension in the link simply has to be adapted so that the new link LK 2 to the now converted element MM-E2 only differs from the old link LK 1 by the extension: Before conversion: LK 1="/privat/holiday.gif" After conversion: LK 2="/privat/holiday.jpg".

Figure 3:
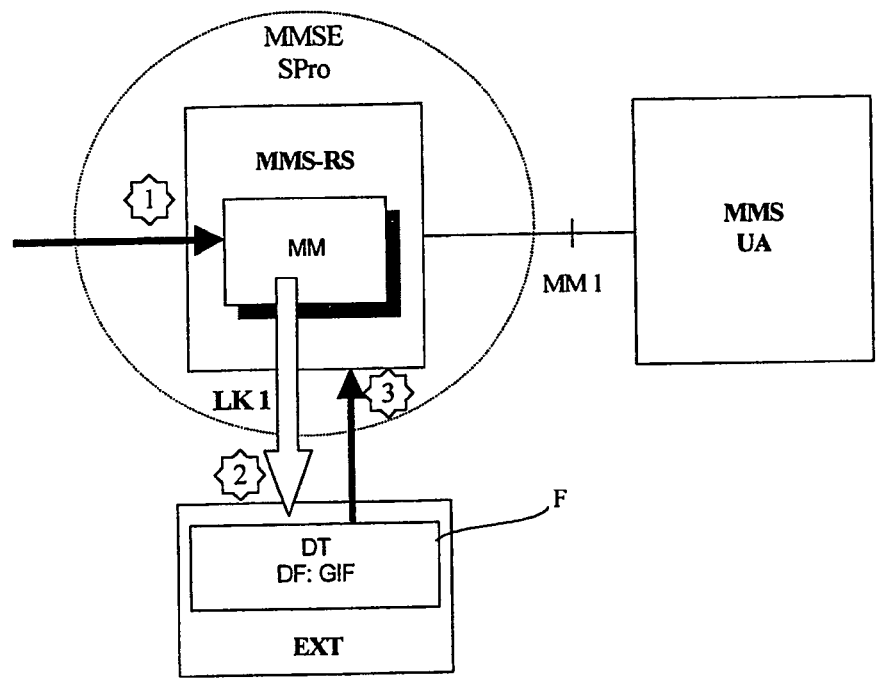
FIG. 3 shows a diagram of an incoming MM in the MMSE that contains a link to a file that is situated on an external server.

2. External Link:

A multimedia message MM that arrives at the MMS relay/server MMS-RS of the receiver as per reference point 1 in the diagram of FIG. 3 contains as reference point 2 a link LK 2 to an external memory location. In accordance with the present invention, before the multimedia message MM is forwarded to the MMS user agent of the receiver, a verification is carried out as to whether the data type and/or the data format of the file referenced by the link has to be converted in accordance with the requirements of the MMS user agent profile. If the MMS relay/server MMS-RS detects the need for a conversion, it has to first read the file from the given memory location and buffer it in the MMSE of the MMS service provider SPro for the purposes of conversion as per reference point 3.

The file converted in accordance with the MMS user agent profile then cannot be re-saved in the external server EXT since it must generally be assumed that the MMS service provider SPro does not have any write rights to the external server EXT. Instead, the converted file must be stored in the MMSE of the MMS service provider SPro in the MMS relay/server or on another server that is connected to the MMS relay/server but not shown in this diagram.

By contrast with case 1 described above, an adaptation of the extension in the link is now no longer sufficient since, as a result of the new memory location of the converted file, the entire path has changed. Instead, the old link LK 1 must be completely replaced by a new link to the memory location within the MMSE of the MMS service provider SPro. This reconciliation of the link must occur before the multimedia message MM is forwarded to the MMS user agent of the receiver, see reference point 4 in the diagram in FIG. 4.

Figure 4:
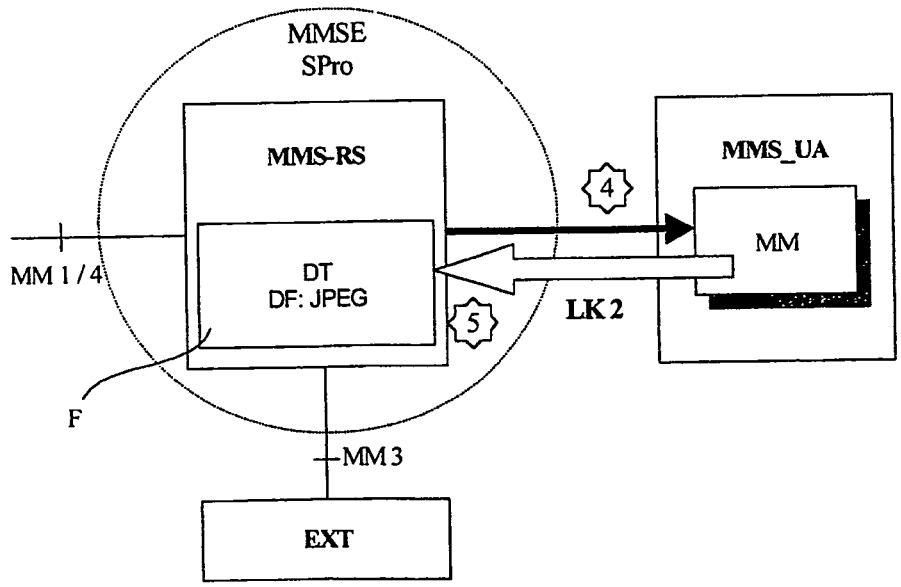
FIG. 4 shows a diagram in which a link points to a memory location in the MMSE of the MMS service provider after data type conversion and/or data format conversion.

If the MMS user agent of the receiver wants to trigger the new link 2 in the multimedia message MM, it finds at the referenced memory location a file converted in accordance with the requirements from the MMS user agent profile, see reference point 5 in the diagram in FIG. 4.

Link LK 1—before conversion:
http://www.external_server.de/public/pictures/holiday.gif
Link LK 2—after conversion:
http://www.MMS_service_provider/pics/holiday.jpg In an alternative embodiment, a method is executed in which each external link within a multimedia message MM is automatically replaced on arrival in the MMSE of a MMS service provider SPro by a new link LK which links to a placeholder for a possible storage space in the MMSE of the MMS service provider SPro. Converted files can be saved to these memory locations in the MMSE at a later stage; i.e., on request. The conversion itself in this embodiment optionally may be first carried out when file download is executed with the help of the link LK from the terminal or the MMS user application MMS-UA.

To summarize, a method is proposed in which every MM that arrives at the MMS relay/server of the receiver is verified to see whether it contains a link to another file. As such, where appropriate, all header fields in the header of the MM and in the headers of the individual MM elements must be verified. Furthermore, the method described usually requires that MM element MM-E that may contain a link, for example SMIL, html or txt, to be opened. Other MM elements MM-E that cannot contain references do not need to be opened. This affects audio files or static images, for example. Since the MM elements MM-E that have to be opened are, as a rule, much smaller than MM elements MM-E that do not have to be opened, the additional processing load in the MMS relay/server MMS-RS of the MMS service provider SPro is very low. With the described method, the MMS service provider SPro can guarantee to his/her customers that all links, both internal links and external links, contained in a multimedia message MM can be triggered in accordance with the information from the MMS user agent profile of the receiver B.

There are many benefits of a method in accordance with the present invention:

Firstly, references within an MM and between different MM elements remain valid after any data type and/or data format conversion in accordance with the MMS user agent profile of the receiver in the MMS relay/server of the receiver.

Secondly, it is proposed, for references from an MM to externally stored files, to check whether the data type and/or data format has to be converted in accordance with the information of the MMS user agent profile of a receiver by the MMS relay/server of the receiver and whether this link has to be adapted accordingly after successful conversion.

With a method of the type described above, it is therefore guaranteed that, in a multimedia message MM with internal links LK, even after conversion of the data type and/or data format, this link LK remains valid. Furthermore, it is guaranteed that an MMS user agent receives files available for download with data types or data formats that he/she is in a position to process as a receiver application even for an MM with external references to files that are stored on an external server EXT and are not part of the MM. This is the only way to ensure that the MM can always can be completely presented in a terminal and in the way in which the sender intended.

The Multimedia Messaging Service MMS specifies mechanisms for transporting any content from a subscriber of the service via a network to another subscriber, with the information elements of the message that can be used for the message transport, the header fields, being able to be employed very flexibly. In summary, several options are proposed for supporting attractive applications for diverse known message types, including those in MMS, whereby the efficiency of the message flow is beneficially improved in that according to the present invention any multimedia message MM can be adapted to the facilities of the receiver and/or set up and displayed as per the provisions of the sender. Transmitting short text messages such as messages from the Short Message Service SMS with a link to other sources, such as references to external internet sites that can be called up with an external application such as an internet browser, poses no problem. The present invention also enables structure-conformant integration of known message flows for all known and future data formats in adapted form together with the appropriate benefits.

Although the present invention has been described with reference to specific embodiments, those of skill in the art will recognize that changes may be made thereto without departing from the spirit and scope of the present invention as set forth in the hereafter appended claims.

Background details on WAP, MMS and cited new code languages are summarized in the following documents:

[1] 3GPP TS 23.040 version 5.3.0, Release 5; Third Generation Partnership Project; Technical Specification Group Terminals; Technical realization of the Short Message Service (SMS).

[2] 3GPP TS 22.140 version 5.1.0, Release 5; Third Generation Partnership Project; Technical Specification Group Services and System Aspects; Multimedia Messaging Service (MMS); Service Aspects; Stage 1.

[3] 3GPP TS 23.140 version 5.2.0, Release 5; Third Generation Partnership Project; Technical Specification Group Terminals; Multimedia Messaging Service (MMS); Functional Description; Stage 2.

[4] Synchronized Multimedia Integration Language, SMIL version 2.0; World Wide Web Consortium; W3C Recommendation; 7 Aug. 2001.

The invention claimed is:

1. A method for transmitting a multimedia message in a communication system, the method comprising:
   transmitting the multimedia message according to a multimedia messaging standard from a transmitting terminal toward a receiving terminal, the multimedia message comprising first and second data elements that are coded to the same or different standards, and a link identifying the second data element and indicating at least one of a data type and a data format of the second data element;
   receiving the transmitted multimedia message at an intermediate terminal connected between the transmitting terminal and receiving terminal,
   in response to receiving the multimedia message, the intermediate terminal:
       automatically performing at least one of a data type and a data format conversion of the second data element based on a profile of the receiving terminal specifying at least one of data types and data formats supported by the receiving terminal; and
       automatically updating the link in the received multimedia message based on the conversion of the second data element to allow the receiving terminal to access the converted second data element using the updated link, wherein the updated link identifies the converted second data element and indicates at least one of a data type and a data format of the converted second data element.

2. The method for transmitting data in a communication system as claimed in claim 1, wherein the intermediate terminal that performs the conversion of the second data element and updates the link is a provider of the receiving terminal.

3. The method for transmitting a multimedia message in a communication system as claimed in claim 1, further comprising verifying the updated link in the multimedia message.

4. The method for transmitting a multimedia message in a communication system as claimed in claim 1, further comprising preparing the multimedia message for transmission as a plurality of data packets containing a header to transport organization information and a body to transmit appropriate payload information as data elements including the first and second data elements.

5. The method for transmitting a multimedia message in a communication system as claimed in claim 1, wherein the link identifying the second data element is included in the first data element such that the first data element links to the second data element.

6. The method for transmitting data in a communication system as claimed in claim 1, wherein the data is transmitted on a WAP-enabled mobile phone.

7. A method for transmitting a data volume in a communication system telecommunications network, the method comprising:
   transmitting the data volume from a user application of a sender terminal to a user application of a receiver terminal via the telecommunications network, the data volume including a first data element and a second data element coded according to the same or different standards, the first data element including a link pointing to the second data element and indicating at least one of a data type and a data format of the second data element;
   accessing a profile of the receiver specifying at least one of data types and data formats supported by the receiver terminal;
   automatically converting at least one of a file type and a file format of the second data element based on the accessed profile of the receiver terminal, and due to the conversion of the second data element, automatically updating the link in the first element that points to the second data element, based on the conversion of the second data element, in order to allow the receiving terminal to access the second data element using the updated link, wherein the updated link identifies the converted second data element and indicates at least one of a data type and a data format of the converted second data element.

8. The method of claim 7, wherein the conversion of the second data element and updating of the link are performed by a relay server connected between the sender terminal and the receiver terminal.

9. The method of claim 7, wherein the conversion of the second data element and updating of the link are performed by a provider of the receiver terminal.

10. The method of claim 7, comprising formatting the data volume to comprise a header for transporting organizational information and a body for transporting data packets.

11. The method of claim 7, wherein the data volume comprises a Multimedia Message (MM) transmitted in a Multimedia Messaging Service (MMS).

* * * * *